United States Patent
Lüdemann et al.

(10) Patent No.: US 6,579,325 B1
(45) Date of Patent: Jun. 17, 2003

(54) SILICONE COMPOSITIONS FOR TREATING WOOL MATERIALS

(75) Inventors: Simpert Lüdemann, Bobingen (DE); Harald Chrobaczek, Augsburg (DE); Theodor Angele, Wertingen (DE); Jürgen Riedmann, Neusäss (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 256 days.

(21) Appl. No.: 09/632,220

(22) Filed: Aug. 3, 2000

(30) Foreign Application Priority Data

Aug. 7, 1999 (DE) .......................... 199 37 477

(51) Int. Cl.[7] ...................... D06M 15/00; D06M 11/00; D06M 13/00
(52) U.S. Cl. ...................... 8/128.3; 8/115.5; 8/127.5
(58) Field of Search .............. 8/115.5, 127.5, 8/128.3

(56) References Cited

U.S. PATENT DOCUMENTS

| | | | |
|---|---|---|---|
| 3,647,728 A | 3/1972 | Deflorin et al. | 260/18 |
| 3,876,459 A | 4/1975 | Burrill | 117/141 |
| 4,098,572 A | 7/1978 | Smith | 8/128 |
| 4,137,179 A | 1/1979 | Koerner et al. | 252/8.6 |
| 4,182,682 A | 1/1980 | Koerner et al. | 252/8.6 |
| 4,248,590 A | 2/1981 | Koerner et al. | 8/128 |
| 4,277,242 A | 7/1981 | McLaren | 8/128 |
| 4,403,011 A | 9/1983 | Skelly et al. | 428/264 |
| 5,087,266 A | 2/1992 | Connell et al. | 8/109 |
| 5,236,465 A | 8/1993 | Ohashi et al. | 8/128.3 |
| 5,612,409 A | 3/1997 | Chrobaczek et al. | 524/838 |
| 6,054,523 A | 4/2000 | Braun et al. | 524/503 |

FOREIGN PATENT DOCUMENTS

| | | |
|---|---|---|
| CA | 2171168 | 12/1999 |
| EP | 1013687 | 6/2000 |
| GB | 1011027 | 11/1965 |
| GB | 1220587 | 1/1971 |
| GB | 1406869 | 9/1975 |
| GB | 2082215 | 3/1982 |
| GB | 1071162 | 6/1997 |

OTHER PUBLICATIONS

Chem. Abstract 84:181573 for CH 573505, Mar. 15, 1976.

*Primary Examiner*—Yogendra N. Gupta
*Assistant Examiner*—Preeti Kumar
(74) *Attorney, Agent, or Firm*—Kevin T. Mansfield

(57) ABSTRACT

Compositions are described with organopolysiloxanes which contain crosslinked units and are further crosslinkable. The compositions further contain reaction products of diepoxides and diamines. They are useful for treating fiber materials, especially textile sheet materials, and can be applied thereto in the form of aqueous solutions or dispersions. Textiles which are 50 to 100% by weight wool and have been finished with the compositions exhibit low shrinkage and low felting tendency during washing operations.

19 Claims, No Drawings

SILICONE COMPOSITIONS FOR TREATING WOOL MATERIALS

The invention relates to compositions comprising specific organopolysiloxanes and reaction products of diepoxides and diamines. It further relates to the use of such compositions for treating fiber materials, especially textile fiber materials containing or consisting of wool.

It is known to treat woolen materials with polymeric compositions in order to control wool felting and shrinkage during washing. The polymers used for this purpose include polyurethanes. The disadvantage of any sole use of polyurethanes for the antifelt finishing of wool is that the hand level may deteriorate significantly as a result in many cases, especially when finishing certain grades of wool.

Silicones have similarly already been used to reduce the shrinkage of wool and hence also the tendency to felt during washing operations. By selecting suitable organopolysiloxanes it is possible to improve the hand of finished wool articles compared with a treatment with polyurethanes. Similarly, the use of organopolysiloxanes containing amino groups for finishing fiber materials is known, especially in those cases where the materials are to have a soft hand.

If the wool is finished using compositions containing exclusively linear organopolysiloxanes, i.e., silicones which are not crosslinked and not crosslinkable, the effect of the aritifelt or shrinkproofing finish is frequently not sufficient. It has been determined, for example, that compositions which contain only polydialkylsiloxanes or polydialkylsiloxanes having terminal hydroxyl groups do not provide the required performance level. Attempts have already been made to solve this problem by using compositions which, in addition to linear polysiloxanes, contain crosslinkable silanes or siloxanes. These crosslinking compounds contain silicon atoms with three or four reactive groups; examples thereof are alkyltrisalkoxysilanes. These crosslinking compounds can be incorporated in linear polydialkylsiloxanes or terminal dihydroxypolydialkylsiloxanes to form crosslinked structures. The addition of such crosslinking compounds containing trifunctional silicon atoms improves the effect of the antifelt finishing of wool. However, it has been determined that the level of this finish is still not optimal in a number of cases if the systems used crosslink only after application to the wool article and are previously devoid of any crosslinking, i.e., contain no units of the hereinbelow mentioned formula (III).

The use of alkylhydrogenpolysiloxanes in crosslinking systems presents a problem in that safety precautions have to be taken because of the possible release of hydrogen. Because of the problems arising with the compositions mentioned, there are already silicones on the market which are already crosslinked to a certain degree, but are still further crosslinkable. Such polysiloxanes, as well as difunctional —$SiR_2O$— units (R=alkyl), also contain trifunctional groupings in which 3 oxygen atoms at a time are attached to one or more silicon atoms. The terminal silicon atoms of the polysiloxane chains may additionally bear OH or OR groups to provide further crosslinkability. Such already precrosslinked polysiloxanes which are still further crosslinkable are in some cases already sufficient to provide better effects for an antifelt finish on wool articles than uncrosslinked silicones. However, there is still room for improvement even compared with such systems.

The treatment with silicones of textile fiber materials consisting of or containing wool is mentioned in a number of documents, for example in DE-A 31 49 680, which describes a two-stage process in which an aminoalkyl-containing polysiloxane can be used, optionally with addition of a crosslinking compound.

GB-A 2 082 215 describes a process for treating textiles made of wool with a composition of methylhydrogenpolysiloxane and a reaction product of epoxy resin and polyacidic amine.

DE-A 30 14 675 reveals a process for treating textile material with crosslinkable polysiloxanes. In this process, the fiber material is treated with an uncrosslinked silicone and a silane crosslinking agent.

DE-A 29 03 334 describes compositions for shrinkproofing wool using silicones which contain silicon atoms each with 3 oxygen atoms attached. The silicones further contain anionic groups.

DE 27 26 108 reveals a process whereby preparations for the shrinkproofing of wool can be prepared. Polysiloxanediols are mixed with aminodi- or trialkoxysilanes.

GB patent specification 1 436 694 treats of siloxanelsilane mixtures for treating wool fiber materials.

CH patent specification 573 505 discloses compositions for the antifelt finishing of wool. These compositions contain reaction products of epoxides with basic polyamides. If these compositions are used not for treating wool but for conferring a water-repellent finish on other textile materials, they are said by this document to be combinable with silicone oil.

U.S. Pat. No. 3,876,459 describes mixtures of siloxane and silane which to some extent may have already reacted with one another, for wool finishing.

DE-A 19 38 555 discloses preparations of reaction products of epoxides with polyamides useful for the antifelt finishing of wool. If they are used for another purpose, namely for conferring a water-repellent finish on other fibers, they can be combined with silicone oils.

DE-A 22 53 939 discloses reaction products of epoxide, epoxysilicone and fatty amine which are further reacted exclusively with dicarboxylic acid or polyamidoamine. They are used for the antifelt finishing of wool.

U.S. Pat. No. 5,236.465 describes curable compositions of polysiloxane and aminosilane for the shrinkproofing of wool. To obtain satisfactory effects, the wool has to be subjected to a surface oxidation before finishing.

EP-A 315 477 likewise treats of silicone mixtures for finishing wool. The process likewise requires a prior oxidative treatment of the wool.

DE-A 28 44 952 describes preparations for shrinkproofing wool. These contain polysiloxanes having mercapto groups. Compounds containing sulfur in the oxidation state-2 have the disadvantage that their production and use, especially under the action of heat, may give rise to odor nuisance and the formation of volatile toxic compounds.

DE-A 28 04 983 discloses a process whereby a polymer is applied to wool and then cured with ionizing radiation. The polymer can be a polysiloxane.

DE-A 27 25 714 discloses silicone emulsions for treating keratin fibers. The emulsions contain polydiorganosiloxane, an organosiloxane having SiH bonds, emulsifier and sodium sulfate or magnesium sulfate.

DE-A 23 65 977 describes compositions for treating keratin fibers which contain an organopolysiloxane having terminal hydroxyl groups and certain tri- or tetrafunctional silanes or their condensates or partial hydrolyzates.

It is an object of the present invention to provide an improved composition for treating fiber materials, especially for treating textile sheet materials which contain wool or consist of wool. By virtue of this improved composition, the wool materials treated therewith shall have a significantly reduced tendency to felt or a distinctly reduced shrinkage during washing compared with untreated wool materials and these wool materials shall have a pleasantly soft hand after washing operations.

This object is achieved by a composition comprising at least the following components A and B:

A) an organopolysiloxane whose terminal groups are of the formula (I)

and which in the polysiloxane chain contains units of the formula (II) and units of the formula (III)

where all the R radicals are each independently a phenyl radical or an alkyl radical of 1 to 4 carbon atoms, all the X radicals are independently R or OH or OR subject to the proviso that at least one of all the X radicals present is OH or OR, R' is $-(SiRR''O)_m-SiX_3$, all the R' radicals are independently R or $-O-(SiR_2O)_n-SiX_3$, and m and n are each from 0 to 200, preferably from 0 to 50, B) a reaction product of a diepoxide and a diamine or a salt of such a reaction product and an acid.

The compositions of the invention may if desired also be used for treating fiber materials, especially textile sheet materials, which include little if any wool. However, they are particularly useful for treating textile sheet materials which are 50 to 100% by weight wool. When they are used for that purpose, their advantages will be shown off to particularly good effect. Wool textiles treated with these compositions posess a remarkably low shrinkage, a pleasantly soft hand and minimal felting after washing. And there is no need for an oxidative pretreatment of the wool, as is required in some prior art processes. Preferred sheet materials of 50 to 100% by weight wool are textile sheet materials such as woven or knitted fabrics, for example sheet materials for clothing articles. Their treatment with compositions of the invention is preferably effected by applying these to the wool materials in the form of an aqueous solution or dispersion and subsequently drying the wool materials. Application may be effected according to known methods customary in textile finishing, for example by padding. If desired, the compositions of the invention can also be applied by spraying. But this is less preferable. In a number of cases it is advantageous to follow the padding and drying with a treatment of the finished wool materials at elevated temperature in order that the compositions on the wool may be cured or crosslinked. Instead of applying the composition in the form of an aqueous solution or dispersion it may also be possible in individual cases to apply the composition in pure form, i.e. to use the composition without addition of water, or as solution in an organic solvent. But both these two methods are less preferable. However, it may be appropriate in certain cases to use one of these methods, namely if a composition according to the invention which contains specific desirable components is not obtainable in the form of a sufficiently stable aqueous solution or dispersion. Preferably, however, compositions according to the invention are used in the form of aqueous solutions or dispersions, i.e., apart from the abovementioned components A and B they additionally include water as component C.

Compositions according to the invention may also if desired be applied to sheetlike fiber materials by means of a coating process. Optionally a reactive silane containing two or more hydroxyl or alkoxy groups is added to the compositions prior to application to the fiber materials.

The textile sheet materials of 50 to 100% by weight wool may contain wool, for example conventional sheep wool, of any provenance. Before or after treatment with compositions according to the invention they may additionally be subjected to a plasma treatment according to the known methods in order that their surface may be physically and/or chemically modified. Such a plasma treatment may in certain cases bring about effect increases. If a plasma treatment of the woolen fiber materials is carried out at all, it is preferable to effect this plasma treatment prior to application of a composition according to the invention. It is further preferable to use an oxygen-containing plasma under reduced pressure.

The sheet materials used may be undyed or may be dyed before or after treatment with compositions according to the invention, preferably prior to this treatment. If the sheet materials consist of fiber blends containing at least 50%, but less than 100%, by weight of wool, the non-wool portion can be any desired fiber which is customarily used in blends with wool.

Compositions according to the invention can be produced by various methods. However, it is possible in an individual case, depending on the nature and amount of the chosen ingredients, that not all the methods described hereinbelow can be employed. One suitable method comprises mixing the components A and B with one another without addition of water and adding further desired components (apart from water) before, during or after mixing. Compositions thus obtained can be used in pure form or after dissolving in an organic solvent. However, this method is less preferable and should be employed only if by reason of the nature and amount of the desired ingredients it is not possible to obtain the composition in the form of a sufficiently stable aqueous solution or dispersion. But even if it is impossible to obtain aqueous solutions or dispersions of compositions according to the invention which are stable for a prolonged period, there are ways and means in a number of cases of circumventing the use of such compositions in neat form or as solution in an organic solvent. One option, if an aqueous solution or dispersion is stable for at least some hours, is to prepare this aqueous solution or dispersion only shortly before it is used for treating the textile fiber materials. A second option is to prepare two separate aqueous solutions or dispersions of which one contains component A and the other component B. Either or both of these dispersions or solutions may contain further components. Combining the two separately prepared dispersions or solutions then produces compositions according to the invention. If two separate aqueous solutions or dispersions are prepared and used, it is possible to apply these—and hence the components A and B—to the fiber materials not simultaneously, but in succession. In this case, accordingly, the compositions of the invention are not present as such before their use, but are only formed on the fiber material. It may be advisable with this variant of their use to apply the first of the two aqueous dispersions or solutions from a bath, for example by padding, and the second by spraying to avoid an application from a second bath washing portions back off which were applied in the first bath. The order of application is freely choosable with this procedure, so that either the aqueous solution or dispersion containing component A can be applied first or that which contains component B.

If compositions according to the invention provide sufficiently stable aqueous solutions or dispersions, for which purpose it may be necessary to add one or more dispersants, then these solutions or dispersions may be prepared according to known methods. Which of these methods is chosen in the individual case depends on the nature and amount of the desired ingredients. One suitable method comprises for example preparing a mixture of components A and B and dissolving or dispersing this mixture in water, with or without prior addition of a dispersant either to the water or to the mixture. Another method comprises first preparing an aqueous solution or dispersion of one of the two components A or B and adding the other component (either in pure form or in the form of an aqueous solution or dispersion of this component) to this solution or dispersion. The dispersions or solutions can be prepared at room temperature or, if necessary, at somewhat elevated temperature. The compositions of the invention, which are preferably present in the form of aqueous solutions or dispersions, or the two separate aqueous solutions or dispersions which contain component A and component B, respectively, are adjusted before use to the desired use concentration customary in textile finishing to obtain liquor concentrations suitable for use.

In many cases, a preferred method of using compositions according to the invention comprises preparing two separate aqueous dispersions of which one contains component A and the other component B. This method is always preferable if it is impossible to obtain aqueous dispersions which contain both component A and component B and are sufficiently stable for a prolonged period. In this case the two separate aqueous dispersions are either applied separately and in succession to the fiber materials or combined only shortly before their use for the treatment of fiber materials and, if appropriate, diluted with water to the concentration which is envisaged for textile finishing, for example diluted to such an extent that the finishing liquor contains about 5 to 25 g/l of component A and 1 to 15 g/l of component B. The two separate aqueous dispersions may each include further constituents. It is frequently advantageous for either or both of these dispersions to contain a cationic or nonionic surfactant or a mixture of such surfactants. Suitable surfactants are described hereinbelow.

A preferred embodiment comprises using the desired surfactant or surfactant mixture (component G) in the preparation of that aqueous dispersion which contains component A; this is the case when 2 separate aqueous dispersions are prepared of which one contains component A and the other component B and they are combined with each other only shortly before their use. In those cases where a single aqueous dispersion which contains both A and B is sufficiently stable, it may likewise include a cationic or nonionic surfactant (component G). Suitable for this purpose are the same surfactants which may be used in the case of separate dispersions. For the preferred case of a surfactant or surfactant mixture being used, the liquor with which the fiber materials are treated contains this surfactant or surfactant mixture. This may frequently provide enhanced stability or homogeneity of this liquor in storage.

Compositions according to the invention must contain at least one component A and one component B of the type specified in claim 1 and more particularly described hereinbelow. However, they may include further components of the hereinbelow mentioned type and water. In addition, they may include additional ingredients of the type known to one skilled in the art of textile finishing, especially wool finishing. Compositions according to the invention preferably do not contain compounds having Si—H bonds. Similarly, component A preferably contains no Si—H bonds. Moreover, compositions according to the invention preferably contain no elements other than carbon, hydrogen, oxygen, nitrogen and silicon with the exception of the metal salts described hereinbelow for use as component F.

Component A is an organopolysiloxane of the kind mentioned above and in claim 1. It is not completely linear, but branched on account of the presence of units of the formula (III):

—SiR(OR')—O—    (III)

It thus contains three or more terminal silicon atoms on account of one or more branches. All the end groups present conform to the formula (I) $X_3Si$—O—. All the R radicals present are each independently a phenyl radical or a linear or branched alkyl radical of 1 to 4 carbon atoms. All the X radicals are independently an R radical, an OH group or an OR radical, where R is as defined above. However, at least one of all the X radicals present must be OH or OR. This ensures that the organopolysiloxane can be further crosslinked. Preferably at least two of the X radicals in all terminal $X_3Si$—O— groups are R.

Component A must include in the polysiloxane chain units of the formula (II):

—SiR$_2$—O—    (II)

If a plurality of longer chains are present because of branching, at least one will contain such units. But units of the formula (II) can also be present in further (side) chains. R here is as defined above. Preferably 80 to 100% of all R radicals present in component A are methyl groups.

Component A, in addition to units of the formula (II), contains units of the formula (III) in the organopolysiloxane chain.

—SiR(OR')—O—    (III)

There is thus a presence of silicon atoms to which three oxygen atoms are attached. This results in branching/crosslinking of the organopolysiloxanes. However, component A is capable of further crosslinking since in at least one of the end groups —O—SiX$_3$ (formula I) one of the X radicals is OH or OR. However, it is also possible for a plurality of the X radicals present to be OH or OR. The further crosslinking via these OH or OR groups can be effected after application of the composition of the invention to the textile sheet materials, for example by curing at elevated temperature and, if appropriate, after hydrolysis to convert the terminal OR groups into OH groups.

The number of units of the formula (III) present in component A can be varied within wide limits. It can be controlled in particular via the nature and amount of starting materials used in the preparation of component A. A known method for preparing polysiloxanes which contain silicon atoms to which 3 oxygen atoms are attached which is familiar to one skilled in the art comprises reacting an organopolysiloxane, for example polydimethylsiloxane, with a trifunctional silane of the formula R—Si(OR$^1$)$_3$, using a basic catalyst. Here R$^1$ is alkyl, for example. Applied to the preparation of component A this means that a method of preparation may comprise reacting an organopolysiloxane of the formula $X_3Si$—O—(SiR$_2$O—)$_z$SiX$_3$ with a silane of the formula R Si(OR')$_3$, of the formula R Si(OR')$_2$(OR$^2$) or of the formula R Si(OR')(OR$^2$)$_2$ where R$^2$ is alkyl, preferably methyl, and z has a value customary for polysiloxanes. The quantitative ratio of organopolysiloxane:silane makes it possible to control the number of trifunctional silicon atoms incorporated in component A and thus the number of units of the formula (III).

In the units of the formula (III) R is as defined above, and preferably 80 to 100% of all R radicals are methyl.

The R' radical in the units of formula (III) is a radical of the formula

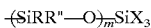

where X and R are as defined above and in claim 1. m is from 0 to 200, preferably from 0 to 50. In a number of cases it is further advantageous for m to be from 1 to 30. If m is not zero, component A contains one or more R" radicals. All R" radicals present are independently an R radical of the type mentioned or a radical of the formula

In the latter case component A, in addition to the branching due to the presence of units of the formula (III), contains one or more further branchings. The amount of starting compounds containing an R" radical may in this case be used to control the branching of component A as it is being prepared. n in the formula specified above for R" is from 0 to 200, preferably from 0 to 50.

As any person skilled in the art of silicone chemistry knows, the synthesis of organopolysiloxanes produces mixtures of products. For component A, which can likewise be such a mixture, this means that not all the polysiloxane molecules making up component A need to contain units of the formula (III). It is sufficient that this is the case with the majority of the molecules. In addition, unbranched polysiloxane molecules of the formula $X_3Si$—O—$(SiR_2O)_z$—$SiX_3$ may be present as well, for example in the form of unconverted starting compounds, in which case z may assume a value customary for organopolysiloxanes.

A suitable method for preparing component A has already been described hereinabove. Organopolysiloxanes suitable for use as component A and their preparation are further described in EP-A 738 747 and EP-A 572 006. Useful components A further include the crosslinked rubbery silicones known from the literature, provided they contain units of the formulae I, II and III. An organopolysiloxane useful as component A is furthermore included in the product CT 25 E from Wacker GmbH, Germany. CT 25 E, which contains other ingredients as well, can be used for preparing compositions according to the invention, since it contains a compound which corresponds to component A.

Compositions according to the invention preferably contain a fraction of 5 to 25%, particularly preferably 10 to 25%, by weight which is not liquid and not flowable and which is insoluble or essentially insoluble not only in petroleum ether (40–60° C. fraction) but also in methylene chloride and toluene. The weight percentages mentioned here are based on the anhydrous composition which contains all the envisaged components apart from water. The said nonliquid fraction, furthermore, is not of oily, but of rubbery consistency. Its amount is a measure of the branched polysiloxane molecules present in component A, or a measure of the number of units of the formula (III). The presence of such a fraction of branched polysiloxane chains which leads to the said nonliquid content is advantageous for improving the effects when treating textiles which are 50 to 100% by weight wool, namely control of shrinkage and felting tendency.

As well as units of the formulae (II) and (III) which must be present in component A, component A may if appropriate additionally contain one or more silicon atoms to each of which are attached 4 oxygen atoms.

Component A preferably contains no compounds having Si—H bonds, since such compounds can give rise to undesirable chemical reactions, for example release of elemental hydrogen. Compositions according to the invention are preferably completely free of compounds having Si—H bonds.

As well as the organopolysiloxanes forming component A, compositions according to the invention may, however, include further polysiloxanes. These are likewise preferably free of Si—H bonds. In a number of cases it is advantageous for the compositions to additionally include as component D a linear, i.e., unbranched, organopolysiloxane of the formula $X_3Si$—O—$(SiR_2O)_z$—$SiX_3$, for example a polydimethylsiloxane. Here, R and X are each as defined above and z has a value customary for polysiloxanes, but in component D it is not necessary for at least one of these X radicals to be OH or OR. Examples of compounds useful as component D are unsubstituted or terminally hydroxyl-substituted polydimethylsiloxanes. The additional use of a component D may cause the hand of the finished fiber materials to become even softer. A similar result can be obtained if compositions according to the invention, in place of component D or in addition thereto, contain an organopolysiloxane which contains substituents in which primary and/or secondary amino groups are present. Instead of the additional use of such amino-functional polysiloxanes, advantageous effects can also be achieved by component A of the compositions according to the invention itself containing radicals with amino groups. In a preferred embodiment, component A, in addition to units of the formula (I), (II) and (III), contains units of the formula (IV).

$$—SiR(Y)—O— \qquad (IV)$$

Here Y is a radical of the formula (V), (VI) or (VII)

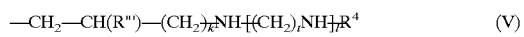

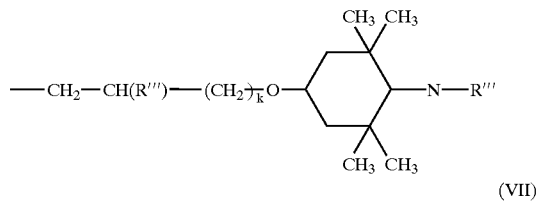

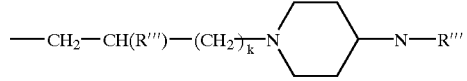

where R''' is H or $CH_3$, k is from 0 to 6, preferably 1, t is from 2 to 8, preferably from 2 to 4, and l is from 0 to 3, preferably 0 or 1, and $R^4$ is H, —CO—$CH_3$, —CO—$(CH_2)_k$OH, —$CH_2$—$(CH_2)_k$—$CH_3$ or cyclohexyl.

The above-described component D may likewise contain amino groups in that, for example, some of the R radicals, for example some of the methyl radicals, in component D may be replaced by radicals of the abovementioned formulae (V), (VI) or (VII).

Both in component A and in component D the nitrogenous radicals of the formulae (V), (VI) and (VIII) mentioned may be replaced by, or additionally encompass, further nitrogenous radicals, for example radicals of the formula (V) where one or more nitrogen-attached hydrogen atoms are replaced by alkyl groups, preferably short-chain, linear or branched alkyl groups. Component A and/or D may in addition contain further radicals in which amido groups, amido and terminal hydroxyl groups, piperidino, piperazino or pyrazino groups are present.

For the abovementioned case of compositions according to the invention, in addition to components A and B, further including one or more organopolysiloxanes containing substituents having amino groups, these additional organopolysiloxanes have in a preferred embodiment a structure of the formula

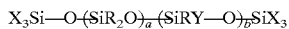

where X, R and Y are each as defined above a has values customary for polysiloxanes, for example between 50 and 3000, and a:b is within the customary range from, for example, 5:1 to 500:1. Such amino-functional polysiloxanes are commercially available products and may be obtained from Dow Corning, among others.

In a preferred embodiment, the weight ratio of units of the formula (II) to units of the formula (III) in component A is within the range from 1:1 to 10:1. The units of the formulae (II) and (III) and optionally (IV) present in component A and any further

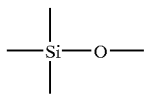

units may be distributed along the polysiloxane chain in any desired pattern.

As well as components A and D, compositions according to the invention may include further polysiloxanes, for example polysiloxanes having polyoxyalkylene radicals. This is more particularly described hereinbelow. Both component A and component D as well as additional polysiloxanes may also contain aromatic radicals which are attached directly or via alkylene bridges to silicon atoms, or long-chain alkyl radicals.

In a preferred embodiment, compositions according to the invention do include a component D of the type described. It is advantageous for component D to be present in such an amount that the weight ratio of component A to component D is within the range from 2:1 to 1:20, particularly preferably within the range from 1:1 to 1:10. Component A is preferably present in compositions according to the invention in an amount of 10 to 30% by weight.

This value is based on the total weight of the composition according to the invention without water and holds for the case where the composition of the invention contains a component D in such an amount that components A and D are present in an A:D weight ratio of 1:1 to 1:10. Preferably the predominant fraction of component A is of nonliquid consistency and essentially insoluble in petroleum ether, methylene chloride and toluene. A small fraction of A, namely a fraction comprising a small number of units of the formula (III), by contrast, can be liquid and soluble in the solvents mentioned. Its presence is explained by the fact that polymer syntheses produce product mixtures.

The demonstration that an organopolysiloxane used as component A contains not only units of the formula (II) but also units of the formula (III) can be conducted by means of a combination of gas chromatography (GC) and mass spectrometry (MS). Before this demonstration is conducted, fractions of uncrosslinked polysiloxanes present, i.e., polysiloxanes which contain no silicon atoms to which 3 oxygen atoms are attached, are removed. Such fractions can be present by reason of deliberate additions (for example the aforementioned component D) or as admixtures coproduced in the course of the production of crosslinked polysiloxanes, i.e., in the course of the production of polysiloxanes containing units of the formula (III). The removal of uncrosslinked polysiloxane fractions which contain no units of the formula (III) can be effected by extraction with 40 to 60° C. petroleum ether. The residue which is insoluble in petroleum ether and which contains component A may additionally be treated with alcoholic potassium hydroxide solution prior to GC/MS in order that any included fractions of uncrosslinked polysiloxanes may be removed as well. The resulting residue is introduced into a gas chromatograph under conditions (about 700° C. under inert atmosphere) at which pyrolysis takes place. The pyrolysis fragments are analyzed by means of MS. This makes it possible to demonstrate whether, in addition to difunctional units of the formula (II), trifunctional units of the formula (III) were likewise present in the analyzed organopolysiloxane.

The demonstration as to whether a composition according to the invention, as well as polysiloxanes containing units of the formula (III), also includes uncrosslinked polysiloxanes, i.e. without units of the formula (III) (component D, for example), can be effected by means of petroleum ether extraction as per the above directions. That the petroleum ether soluble fraction consists of polysiloxane which is free of units of the formula (III) (but may contain amino groups in side chains) can be confirmed by means of $^{29}$Si NMR spectroscopy. As indicated above and in claim 1, at least one of the X radicals in one of the —SiX$_3$ end groups of component A must be OH or OR. This ensures that component A is further crosslinkable. The capability for further crosslinking with reactive groups can therefore serve as evidence that at least one end group contains an OH or OR radical. If appropriate, the crosslinking has to be preceded by a hydrolysis to convert an OR group into an OH group. The analytical detection of the hereinbelow discussed component B can be effected by means of chemical methods or by means of GC/MS after a pyrolysis, in certain circumstances also by means of UV spectroscopy.

Compositions according to the invention, as well as the hereinabove described component A, must further include at least one component B. It is true that the use of a suitable component A alone may in certain circumstances already provide an adequate effect level with regard to shrinkage and felting tendency in the finishing of wool textiles. Even prior art polysiloxanes known for wool finishing will provide certain effects. However, it has been determined that the additional use of a component B will further enhance these effects, for example with regard to their permanence during washing or else that the same effect level will as a result be achieved at distinctly lower amounts of organopolysiloxane.

Component B is the reaction product of a diepoxide and a diamine or a salt of such a reaction product and an acid. Preferably component B is such a salt. Compositions according to the invention may be prepared using component B already in the form of such a salt or still in the form of the reaction product of diepoxide and diamine prior to reaction with an acid. In the latter case, the preparation of the composition or the preparation of an aqueous solution or dispersion of components A and B is preferably followed by the addition of an acid in such amounts that the composition, solution or dispersion has an acidic pH, for example within the range from 4 to 6.5. Component B is subsequently present in the form of a salt, which may be partially or completely dissociated.

Diamines in the context of component B are compounds which contain two primary amino groups (—NH$_2$ groups). However, they may additionally contain secondary and/or tertiary amino groups. A diamine which under this definition is particularly useful for preparing a component B is for example a diamine of the formula H$_2$N—(CH$_2$)$_d$—NH—(CH$_2$)$_d$—NH$_2$, where each of the two indices d is independently from the other a number from 2 to 8. A useful product of this kind is diethylenetriamine (d=2). Further useful diamines are those of the formula H$_2$N—(CH$_2$)$_d$—NH$_2$. Particularly useful components B are reaction products of an aromatic diepoxide and an aliphatic diamine or salts which are formed from such a reaction product and an acid. However, it is also possible to use reaction products of aromatic diamines and diepoxides or reaction products which were prepared using as the diamine component a polysiloxane which contains two radicals each having a primary amino group, for example a linear polysiloxane whose two chain ends feature the structural units H$_2$N—(CH$_2$)$_x$—SiR$_2$—, where x is from 2 to 4.

Diepoxides are compounds having two epoxy groups. These compounds may be monomeric, oligomeric or polymeric. Useful diepoxides also include for example linear polysiloxanes where each of the two chain ends features a radical having an epoxide group which is attached to the terminal Si atom via a short alkyleneoxy chain. Particularly useful components B for compositions according to the invention are reaction products formed from a diglycidyl ether of a dihydric phenol and a diamine of the above-described kind or salts which are formed from such reaction products and acids. The hereinmentioned diglycidyl ethers of dihydric phenols may have one or more aromatic rings, thus being for example of the formula

or the formula

or the formula

wherein C$_6$H$_4$ is a divalent radical derived from benzene and G is glycidyl

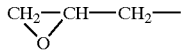

The two free valences on the C$_6$H$_4$ radicals are preferably disposed in para position. The reaction product of diepoxide and diamine can be prepared according to known methods, in which case the epoxide rings are opened and monomeric, oligomeric or polymeric products are formed according to the reaction conditions. The reaction product is preferably not used as component B as such, but in the form of a salt of this reaction product and an acid. The salt is preferably formed using an organic acid, especially an aliphatic monocarboxylic acid having 1 to 4 carbon atoms.

Compositions according to the invention preferably include component A and component B in such amounts that the weight ratio of A to B is within the range from 1:1 to 15:1.

As well as the described components A, B, C and D, compositions according to the invention may include further components. It is advantageous in many cases for them to additionally include polyvinyl alcohol (PVA) as component E. PVA may act as a protective colloid. The amount of PVA present in compositions according to the invention is preferably 0.5 to 3% by weight.

Further preferred embodiments of compositions according to the invention include one or more of the following components F and/or G:

Component F is a metal salt selected from carboxylates, sulfates or halides of alkali metals, alkaline earth metals, titanium, tin or zinc. The salts of titanium, tin and zinc in particular may contain organic groups attached to the metal. Examples of such salts are dialkyltin dicarboxylates and dialkyltitanium dicarboxylates. Component F may also be a mixture of such metal salts.

Component G is a cationic or nonionic surfactant or a mixture of such surfactants. Anionic surfactants are less preferable.

The metal salt, or the mixture of metal salts (component F), is preferably present in compositions according to the invention in an amount of 0.1 to 1% by weight, these percentages being based on the elemental metal and the anhydrous composition. The metal salt or metal salt mixture has the function of a catalyst for the further curing or crosslinking of component A, which may take place between siloxane molecules or between component A and the textile material. Crosslinking may be achieved by subjecting the textile material finished with a composition according to the invention to a thermal treatment. Crosslinking is a preferred measure after the composition has been applied and the textile material has been dried, since crosslinking provides in many cases improved permanence for the low shrinking and felting tendency during washing.

Surfactants are preferably added to compositions according to the invention to prepare stable aqueous dispersions of the compositions. These aqueous dispersions, as stated above, may be liquors which have already been diluted to the use concentration customary for textile treatment. In this case, the concentrations specified hereinbelow for the surfactant content are correspondingly lower by reason of the dilution and lie within the range customary for textile finishing liquors. The amount of surfactant or surfactant mixture required here is within the range customary for silicone emulsions, which extends from about 1 to 5% by weight, based on aqueous dispersion. In the individual case, the amount of surfactant or surfactant mixture required depends on the nature and amount of the ingredients of the dispersion.

Very useful surfactants are nonionic and cationic dispersants, for example fatty alcohol alkoxylates, fatty acid alkoxylates and quaternary ammonium compounds. A particular class of useful surfactants are polydimethylsiloxanes in which some of the methyl groups are replaced by radicals containing polyoxyalkylene units. Furthermore, in these polydimethylsiloxanes, further methyl groups may be replaced by amino-containing radicals. Such surfactant polysiloxanes are described for example in EP-A 578 144 and in references cited in said EP-A.

In a preferred embodiment of compositions according to the invention, these include as component G a surfactant or surfactant mixture selected from compounds of the formula

where the individual —CH$_2$CH$_2$—O— and —CHR$^b$—CHR$^c$—O— units may be distributed along the molecular chain in any desired pattern and x is from 2 to 30, preferably from 4 to 20 y is from 0 to 10 and x is not less than y, and all the $R^a$ radicals are independently hydrogen, an alkyl or alkenyl group of 1 to 18 carbon atoms, an amino group or a quatemized ammonium group where, however, no direct oxygen-nitrogen bond is present, or a group derived by removal of an Si— attached radical from a poly- or oligodiorganosiloxane and one of $R^b$ and $R^c$ is H and the other is —$CH_3$. These surfactants are accordingly ethoxylated (y=0) or ethoxylated/propoxylated compounds (y>0). The dispersing effect is greater when x≧y. When y>0, the polyoxyethylene and polyoxypropylene units may be distributed along the molecular chain in any desired pattern, i.e., random or block copolymers can be present. The two $R^a$ radicals at the ends of the alkoxylate chain are each independently hydrogen or one of the groups mentioned above and in claim 13. However, when $R^a$ is an amino or ammonium group, the nitrogen atom of this group is not directly attached to an oxygen atom. When $R^a$ is a quaternized ammonium group, then the associated anion is preferably a halide or sulfate anion. When $R^a$ is an amino or a quatemized ammonium group, then the two or three other substituents on the nitrogen atom are preferably selected from the group consisting of hydrogen, short-chain and long-chain alkyl groups and—($CH_2CH_2O$—$)_x$H groups, where x is from 2 to 30.

Very useful surfactant mixtures include a modified dimethylsiloxane in which one or more methyl groups are replaced by a radical containing an ethoxylated/propoxylated group and further include one or more ethoxylated aliphatic alcohols of 8 to 14 carbon atoms.

Compositions according to the invention are useful for treating fiber materials, especially textile sheet materials, which are 50 to 100% by weight wool. Applying the compositions and drying the textiles and preferably curing them at elevated temperatures, preferably within the range from 110 to 180° C., markedly reduces the shrinkage and felting tendency of the wool.

The felting tendency of untreated wool during washing leads to disadvantages in clothing articles with regard to aesthetics and wear comfort. The shrinkage of woolen textile sheet materials during washing may be deemed a measure of the felting tendency. It has been determined that compositions which include at least component A and component B are very useful for significantly reducing the shrinkage and felting of wool, especially if the application of the composition according to the invention and the drying of the textiles is followed by a curing step to effect crosslinking of component A. This provides textiles having very good wash-and-wear properties. For this purpose, the compositions are preferably applied to the textiles in such an amount that the add-on on the textiles is 3 to 15% by weight (based on total weight of the textile after drying at 110° C./10 min and reckoned as anhydrous composition) of the composition.

The examples hereinbelow illustrate the invention.

In these examples, the shrinkage of the treated textiles was determined according to the method described hereinbelow and used as a measure of the felting tendency of the woolen textiles: the lower the shrinkage, the lower the felting tendency, the better the wash-and-wear properties. In addition, the appearance of the textiles was rated on the Monsanto scale. The Monsanto rating gives a measure of the appearance of a textile surface; the higher the rating, the better the quality of the fabric. In the examples which follow, no Monsanto rating was awarded to badly felted fabric. In commercial practice, a Monsanto rating of not less than 3.0 is deemed to be the minimum requirement for good fabric quality with regard to wash-and-wear properties. The Monsanto rating is awarded on the basis of the visual appearance of the fabric surface.

EXAMPLE 1

Comparative, Not According to Invention

A woven fabric which was 100% composed of red-dyed wool and which had been neutralized beforehand by treatment with ammonia was dipped in water, squeezed off to 100% wet pick-up, dried at 110° C. for 10 minutes and subsequently subjected to a heat treatment of 160° C./5 minutes. The fabric thus treated was washed 3 times with program 5 A (in accordance with IWS test method TM 31 of the International Wool Secretariat) and subsequently rated for shrinkage on the basis of dimensional change (in accordance with the abovementioned test method TM 31).

EXAMPLES 2 TO 7

Example 1 was repeated except that instead of being treated with water the fabric was padded in various treatment liquors. A 100% wet pick-up means that the fabric has twice the weight after squeezing off of the dry fabric prior to treatment with the liquor. A Monsanto rating was awarded after the treatment at 160° C. where this was sensible on the basis of the appearance.

Examples 2 to 5 hereinbelow are comparative examples, not according to the invention, while Examples 6 and 7 concern the treatment of the wool fabrics with compositions according to the invention.

The products used for the individual treatment liquors were as follows:

a)=polydimethylsiloxane in which some of the methyl groups were replaced by amino-containing radicals. This siloxane contained no crosslinked moieties, i.e., no units of the formula (III). The end groups of the polysiloxane chain were partly OH and partly $OCH_3$ groups.

b)=organopolysiloxane having hydroxyl end groups, with units of the formula (II) and with units of the formula (III) (component A of claim 1). This polysiloxane was insoluble in petroleum ether (40–60° C. fraction), in $CH_2Cl_2$ and toluene and did not contain any Si—H bonds.

c) polydimethylsiloxane which is soluble in petroleum ether and free of amino groups and of Si—H bonds.

d) acetic acid-neutralized reaction product of bisphenol A diglycidyl ether and an aliphatic diamine of the formula $H_2N$—($CH_2$—$)_x$$NH_2$ (component B); the product prior to neutralization with acetic acid is obtainable by reaction of E—$CH_2$—O—p—$C_6H_4$—$C(CH_3)_2$—p—$C_6H_4$—O—$CH_2$—E with $H_2N$—($CH_2$—$)_x$$NH_2$ in an approximately equimolar ratio, E being a univalent radical derived from ethylene oxide. The product is adjusted with acetic acid to a pH of about 5.0–6.5.

e) polyvinyl alcohol (molecular weight about 50,000)

f) fatty alcohol polyglycol ether g) quaternized ammonium salt h) dialkyltin dicarboxylate i) (8:1) zinc stearate/zinc chloride The treatment liquors contained the following constituents (amounts in g/l of treatment liquor)

| | Constituent | Amount |
|---|---|---|
| Example 2 | b | 9 |
| | c | 27 |
| | e | 1.8 |
| | g | 0.6 |
| | h | 0.06 |
| Example 3 | b | 13.5 |
| | c | 40.5 |
| | e | 2.7 |
| | g | 0.9 |
| | h | 0.09 |
| Example 4 | b | 18 |
| | c | 54 |
| | e | 3.6 |
| | g | 1.2 |
| | h | 0.12 |
| Example 5 | a | 45 |
| | f | 13.5 |
| Example 6 | b | 13.5 |
| | c | 40.5 |
| | d | 1.6 |
| | e | 2.7 |
| | f | 0.4 |
| | g | 0.9 |
| | h | 0.09 |
| | i | 1.4 |
| Example 7 | b | 13.5 |
| | c | 40.5 |
| | d | 5 |
| | e | 2.7 |
| | g | 0.9 |
| | h | 0.09 |

The table hereinbelow reports the shrinkage values and Monsanto ratings (where awarded) for the individual examples. The shrinkage values are reported in % dimensional change, the values each representing the average of the shrinkage in the warp direction and in the weft direction. Where a ⊖ is shown in the Monsanto rating column, no rating was awarded because of the badly felted appearance of the surface.

TABLE

| Example | Shrinkage (%) | Monsanto rating |
|---|---|---|
| 1 | 29 | ⊖ |
| 2 | 15 | ⊖ |
| 3 | 5.5 | 1.8 |
| 4 | 5 | 2.0 |
| 5 | 12.5 | ⊖ |
| 6 | 1 | 4.2 |
| 7 | 0.7 | 3.8 |

It is observed that the treatment with compositions which include a component A but no component B (Examples 2, 3 and 4) provides some improvement on increasing the amount of precrosslinked polysiloxane. However, the addition of a component B (Examples 6 and 7) gives a significant improvement. The treatment with a nonprecrosslinked polysiloxane which does not correspond to component A (Example 5) likewise leads to distinctly worse results than the treatment with compositions according to the invention (Examples 6 and 7).

What is claimed is:

1. A composition comprising at least the following components A and B:

A) an organopolysiloxane whose terminal groups are of the formula (I)

and which in the polysiloxane chain contains units of the formula (II) and units of the formula (III)

where all the R radicals are each independently a phenyl radical or an alkyl radical of 1 to 4 carbon atoms,
   all the X radicals are independently R or OH or OR subject to the proviso that at least one of all the X radicals present is OH or OR,
   R' is $-(SiRR''O)_m SiX_3$
   all the R'' radicals are independently R or $-(SiR_2O)_n SiX_3$, and m and n are each from 0 to 200, B) a reaction product of a diepoxide and a diamine or a salt of such a reaction product and an acid.

2. A composition according to claim 1, further comprising water as component C.

3. A composition according to claim 1, comprising 5 to 25% by weight of a nonliquid fraction based on the anhydrous composition which is insoluble not only in 40–60° C. petroleum ether but also in methylene chloride and toluene.

4. A composition according to claim 1, wherein component A additionally contains units of the formula (IV)

where Y is a radical of the formula (V), (VI) or (VII)

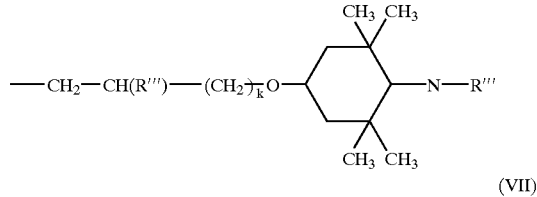

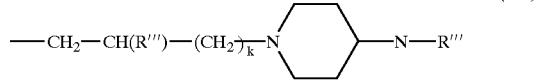

where R''' is H or $CH_3$,
k is from 0 to 6,
t is from 2 to 8,
and
I is from 0 to 3,
and
$R^4$ is H, $-CO-CH_3$, $-CO-(CH_2)_k OH$, $-CH_2-(CH_2-(CH_2)_k CH_3$ or cyclohexyl.

5. A composition according to claim 1, wherein the weight ratio of units of the formula (II) to units of the formula (III) in component A is within the range from 1:1 to 10:1.

6. A composition according to claim 1, wherein 80 to 100% of all R radicals present in component A are methyl groups.

7. A composition according to claim 1, which is free of compounds having Si—H bonds.

8. A composition according to claim 1, wherein component B is a reaction product of an aromatic diepoxide and an aliphatic diamine or a salt of such a reaction product and an acid.

9. A composition according to claim 1, wherein component B is the reaction product of a diglycidyl ether of a dihydric phenol and a diamine of the formula

or of the formula

or a salt of such a reaction product and an acid, d being from 2 to 8.

10. A composition according to claim 1, wherein component B is a salt of an organic acid.

11. A composition according to claim 1, further comprising polyvinyl alcohol as component E, a metal salt as component F, and/or a cationic or nonionic surfactant or a mixture of such surfactants as component G, the metal salt, component F, being selected from carboxylates, sulfates or halides of alkali metals, alkaline earth metals, titanium, tin or zinc.

12. A composition according to claim 11, wherein the surfactant or surfactant mixture is selected from the compounds of the formula

where the individual —$CH_2CH_2$—O— and —$CHR^b$—$CHR^c$—O— units may be distributed along the molecular chain in any desired pattern and x is from 2 to 30, y is from 0 to 10 and x is not less than y, and all the $R^a$ radicals are independently hydrogen, an alkyl or alkenyl group of 1 to 18 carbon atoms, an amino group or a quaternized ammonium group where, however, no direct oxygen-nitrogen bond is present, or a group derived by removal of an Si— attached radical from a poly- or oligodiorganosiloxane and one of $R^b$ and $R^c$ is H and the other is —$CH_3$.

13. A composition according to claim 1, which apart from a metal salt, contains no elements other than carbon, hydrogen, oxygen, nitrogen and silicon.

14. A composition according to claim 1, wherein the weight ratio of component A to component B is within the range from 1:1 to 15:1.

15. A composition according to claim 1, wherein the weight ratio of component A to component D is within the range from 2:1 to 1:20.

16. A composition according to claim 2, being an aqueous solution or dispersion.

17. A method for treating fiber materials, which comprises applying a composition according to claim 1 to the fiber materials in such a way that a component A and a component B are applied to the fiber materials either simultaneously or in succession.

18. A method according to claim 17, wherein the fiber materials are 50 to 100% by weight wool.

19. A composition according to claim 1, further comprising as component D a linear polydimethylsiloxane in which optionally some of the methyl groups are replaced by radicals of the formula (V), (VI) or (VII)

   (V)

(VI)

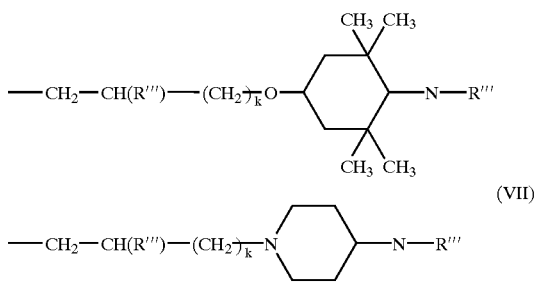

(VII)

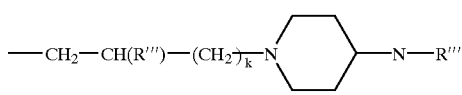

where R'''is H or $CH_3$, k is from 0 to 6, t is from 2 to 8, and

I is from 0 to 3, and $R^4$ is H, —CO—$CH_3$, —CO—($CH_2$)—OH, —$CH_2$—($CH_2$)$_t$—$CH_s$ or cyclohexyl.

* * * * *